(12) United States Patent
Penman

(10) Patent No.: X8400
(45) Date of Patent: Sep. 9, 1834

(54) SAW MILL, CIRCULAR

(76) Inventor: John Penman

John Penman, Charlotte, North Carolina.

Letters Patent.

The Schedule, referred to in these Letters Patent and making part of the same, containing a description in the words of the said John Penman, himself, of his improvement in the Circular Saw Mill.

To all to whom these presents shall come.

Be it known that I, John Penman, of Charlotte, in the County of Mecklenburgh, and State of North Carolina, have invented a new and useful improvement in the Circular Saw Mill. And that the following is a full and exact description of the Construction and operation of the said Machine, as invented or improved by me. A frame is construct-ed of any suitable timber, of sufficient strength to bear the usual wear of Saw Mills. It is to be of an oblong form, of about seventy eight feet long, by about thirteen feet wide, and about twenty four feet high at one end and about twenty one at the other, thereby allowing an inclination of about three feet in the whole length. The ends of the frame are connected together at the top and bottom, in the usual manner for strength. Along the side pieces which may be at about twelve feet from the ground at the highest end, to descend towards the other, in the inclination above given, are to run grooves in the whole length for the reception of the carriage. This Carriage may be about thirty four feet in length, and of suffi=cient width to slide in the grooves above described. Besides the two side pieces, others are placed near the Middle, one on each side the the [illegible] of the width for the support of the log to be sawed; and which is to be moved as required in the sawing, which may be done by means of a screw at each end. along the left side of this carriage, is in the whole length a double rack, one to be more elevated than the other, that nearest the centre of the carriage may be the lower. At about eighteen feet from each end is to be another frame of about the same height and extending, on each side of the centre of the length of the Carriage frame, about fifteen and a half feet, and as as much wider than the carriage frame, as may be necessary for the reception of a combination of wheels to drive the Machinery. this may be about one foot. At about nine feet from the ground, is to be secured a side piece to this frame, for the reception of the axles of the wheels to be used in propelling the Machine, and above this, will be another of a sufficient height to receive the axis of the upper saw. At about one and a half foot from the front end of this frame, is to pass the axis of the power wheel through the side piece. The diameter of this wheel may be about three feet, and works into a smaller one of about one and a half foot — which has secured on its axis a large one of three feet; this drives both the axles of the saws, by wheels of about one and a half foot in diameter. On the opposite end of the axis of the power wheel, between the carriage frame and the outer frame, is secured a wheel of about one and a half foot in diameter, working in a wheel above it, of about three feet, which has, secured to its axis, a smaller one, of about one and a half foot in diameter. This works into one at the side of it, of about three feet in diameter, having on its axis, towards the centre of the carriage, two other wheels one of about a foot and a half in diameter, and the other about two feet in diameter. These wheels are secured together by a projection from the centre of each, leaving room enough between them, for a groove, in which rests a forked lever, working on a point above, by the inclination of which to one side or the other, a corresponding motion is produced in the wheels, for which a provision is made on the axis of the large wheel to which they are affixed, consisting of a tongue and a groove in the corresponding cavity of said wheels so joined. This tongue and groove prevent their turning on their axis. They work in the rack beneath them, the the smaller one for the purpose of driving the log forward & the larger one for sending it back again for a new cut. They are sufficiently wide apart, that when one is in gear the other is out. The saws are affixed to the axles of the two wheels at the termination of of the combination, driven by the large power wheel wheel. These axles pass across the frame for that purpose and are so situated that the circumference of each saw will reach beyond the line, situated midway between these two axles. These saws should revolve in the same place.

My claim consists in the application of two circular saws operating in the same plane, one above, and the other below, of which more may be applied if thought necessary. The speed of the saws may be varied at the option of the builder.

In testimony that the above is a true and correct de= scription of the construction and use of my Machine, as invent-ed by me, I have hereunto set my hand this third day of September eighteen hundred and thirty four.

Exd.

Witnesses

Henry Stone.

Robt Clarke

John Penman.

Drawing 949 words]